United States Patent
Vasanoja

(10) Patent No.: US 6,405,328 B1
(45) Date of Patent: Jun. 11, 2002

(54) METHOD FOR RESETTING PROCESSOR, AND WATCHDOG

(75) Inventor: Juha Vasanoja, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/214,392

(22) PCT Filed: Jul. 8, 1997

(86) PCT No.: PCT/FI97/00444
§ 371 (c)(1),
(2), (4) Date: Jan. 28, 1999

(87) PCT Pub. No.: WO98/01802
PCT Pub. Date: Jan. 15, 1998

(30) Foreign Application Priority Data

Jul. 9, 1996 (FI) .................................................. 962795

(51) Int. Cl.⁷ ................................................ H02H 3/05
(52) U.S. Cl. ............................ 714/55; 714/23; 327/142
(58) Field of Search ......................... 714/55, 48, 1, 714/815, 23; 327/142; 700/295; 307/39

(56) References Cited

U.S. PATENT DOCUMENTS

| | | | |
|---|---|---|---|
| 4,689,766 A | * | 8/1987 | Kent ........................... 714/23 |
| 4,727,549 A | | 2/1988 | Tulpule et al. |
| 4,752,930 A | | 6/1988 | Kitamura et al. |
| 5,199,007 A | | 3/1993 | Okano |
| 5,522,040 A | | 5/1996 | Hofsäss et al. |
| 5,704,038 A | * | 12/1997 | Mueller et al. ................ 714/55 |
| 5,708,776 A | * | 1/1998 | Kikinis ........................ 714/55 |
| 5,864,663 A | * | 1/1999 | Stolan ......................... 713/502 |
| 6,243,837 B1 | * | 6/2001 | Zimmermann et al. ....... 714/51 |

FOREIGN PATENT DOCUMENTS

EP  0 590 637  4/1994

* cited by examiner

Primary Examiner—Robert Beausoleil
Assistant Examiner—Rita A. Ziemer
(74) Attorney, Agent, or Firm—Altera Law Group, LLC

(57) ABSTRACT

The invention relates to a method for resetting a processor, and a watchdog for generating a reset pulse to a processor which can initialize itself and which sends acknowledgement pulses at predetermined intervals to the watchdog comprising transmission means (5) for generating and transmitting reset pulses to the processor. The watchdog comprises counter means (7) for counting the number of reset pulses generated during initialization and for setting a predetermined limit value to reset pulses. The watchdog further comprises measuring means (4) for measuring the interval between acknowledgement pulses sent by the processor. In addition, the watchdog comprises transmission means (5) for transmitting a reset pulse when the interval between acknowledgement pulses differs from a predetermined interval.

9 Claims, 1 Drawing Sheet

METHOD FOR RESETTING PROCESSOR, AND WATCHDOG

FIELD OF THE INVENTION

The invention relates to a method for resetting a processor by means of a watchdog, wherein the processor performs initialization and sends acknowledgement pulses at predetermined intervals to the watchdog, and wherein the watchdog generates and transmits reset pulses to the processor.

The invention further relates to a watchdog for generating a reset pulse to a processor which can initialize itself and which sends acknowledgement pulses at predetermined intervals to the watchdog comprising transmission means for generating reset pulses and transmitting them to the processor.

BACKGROUND OF THE INVENTION

It is previously known to use watchdogs in a processor and microprocessor environment. A watchdog is used for generating a reset pulse and transmitting it to a microprocessor, when the microprocessor or some other part of a microprocessor system has for some reason entered into an unstable state. When the microprocessor receives a reset pulse, it performs the reset in a controlled manner. After the reset, the microprocessor initializes itself for instance by loading the operating system, and after that tries to continue to operate normally.

A watchdog may monitor acknowledgement pulses sent by a microprocessor in many different ways. It is known to use watchdogs based on a counter or on allocation of capacitance. If the acknowledgement pulses are received too late, the watchdogs send a reset pulse to the microprocessor. However, the known watchdogs are not sufficiently reliable. In addition, by means of the known watchdogs, it has not been possible to determine the correct transmission moment of a reset pulse efficiently and accurately enough. The known watchdogs, moreover accept acknowledgement pulses that are received too frequently.

BRIEF DESCRIPTION OF THE INVENTION

The object of the present invention is to provide a watchdog that measures acknowledgement pulses sent by a microprocessor and, if necessary, transmits reset pulses on the basis of the measurement.

This is achieved with a method of the type disclosed in the introductory portion, said method being characterized by setting a limit value to the number of reset pulses generated during the initialization of the processor, counting the number of reset pulses generated during the initialization, measuring the interval between the acknowledgement pulses sent by the processor, and when the interval between the acknowledgement pulses differs from the predetermined interval, transmitting a reset pulse.

The watchdog of the invention is characterized by comprising counter means for counting the number of reset pulses generated during initialization and for setting a predetermined limit value to reset pulses, measuring means for measuring the interval between acknowledgement pulses sent by the processor, and transmission means for transmitting a reset pulse when the interval between acknowledgement pulses differs from a predetermined interval.

The solution of the invention has significant advantages. Acknowledgement pulses sent by a microprocessor are measured accurately and reliably, since the solution is digital. The measurement of acknowledgement pulses is based on measuring the interval between the pulses, which allows a reset pulse to be sent to the processor when a fault occurs in the microprocessor system. In addition, the transmission of reset pulses from a watchdog of the invention during the initialization of the microprocessor is prevented by means of a suitable starting delay.

The preferred embodiments of the method and watchdog of the invention are disclosed in the attached dependent claims.

BRIEF DESCRIPTION OF THE DRAWINGS

In the following, the invention will be described in greater detail with reference to the examples of the accompanying drawings, in which.

DESCRIPTION OF THE PREFERRED EMBODIMENTS

Figure 1:
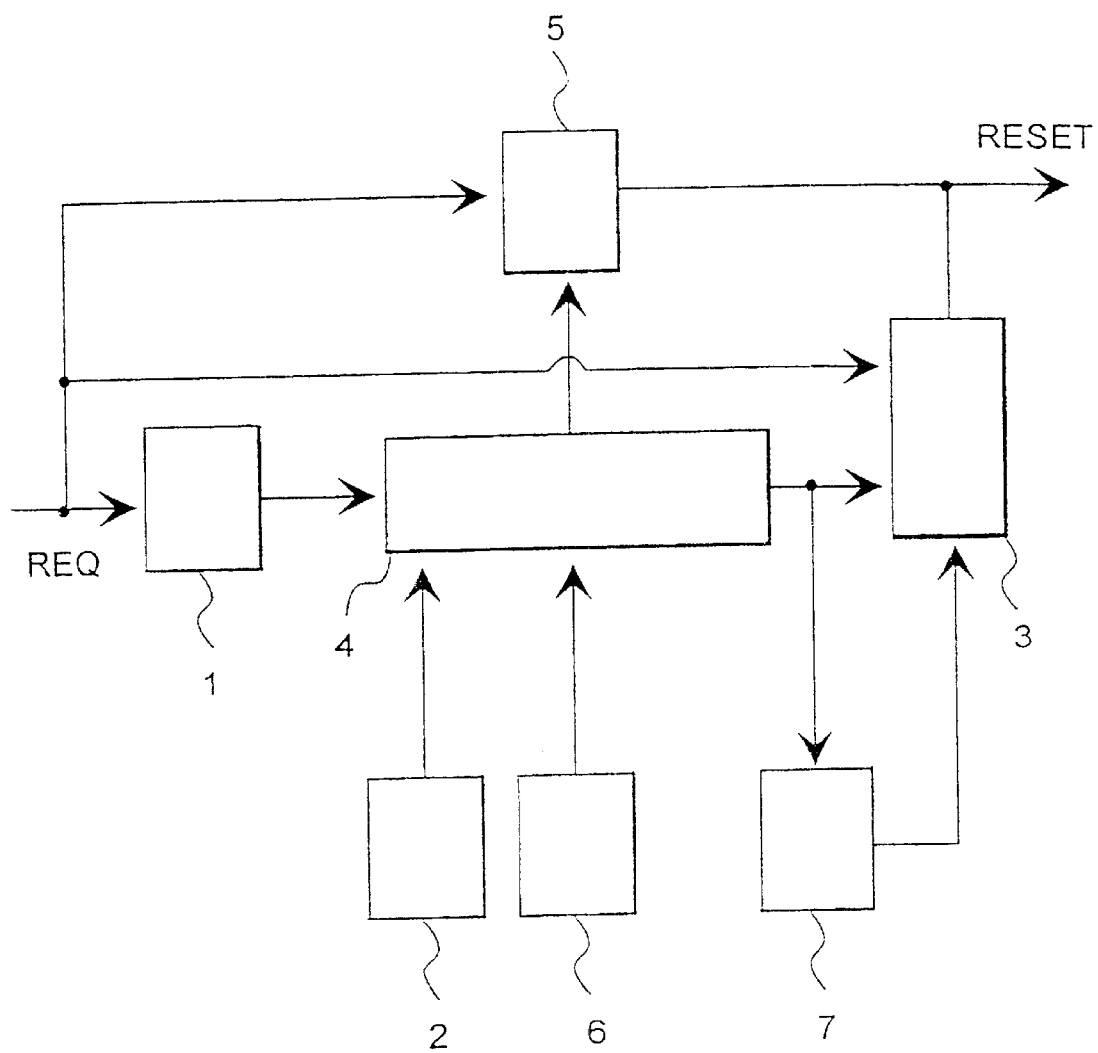
FIG. 1 illustrates the structure of a watchdog of the invention.

FIG. 1 illustrates a watchdog comprising a pulse separator 1, an oscillator 2, and a delay element 3. The watchdog further comprises measurement means 4 connected to the pulse separator 1. The pulse separator 1 sends a signal to the measurement means 4. The watchdog further comprises transmission means 5. The measurement means 4 shown in the figure transmit a signal to the transmission means 5 and the delay element 3. A reset pulse (RESET) is generated on the basis of the output signals of the transmission means 5 and the delay element 3. The measurement means 4 measure acknowledgement pulses (REQ) received from the microprocessor, and send the information obtained on the basis of the measurement to the transmission means 5.

In the solution shown in the figure, acknowledgement pulses received from the microprocessor are also supplied to the delay element 3. The delay element 3 forms a predetermined delay for the reset pulse generated by the watchdog. The watchdog further comprises setting means 6 and counter means 7, both of which are connected to the transmission means 4. The setting means 6 set one or more time limits to the watchdog. The counter means 7 count the number of acknowledgement pulses sent by the microprocessor. The oscillator 2 generates an accurate and reliable clock signal for the counter means 7.

In the solution according to the figure, the microprocessor sends acknowledgement pulses to the watchdog. An acknowledgement pulse is at first supplied to the pulse separator 1 of the watchdog, where it is adapted for the measurement means 4. The adaptation of an acknowledgement pulse is required if the input of the measurement means 4 is level-controlled. If the input of the measurement means 4 is edge-triggered, a pulse separator 1 is not necessary. Edge triggering can prevent continuous acknowledgement in a situation where an acknowledgement pulse, for some reason, erroneously remains in the acknowledgement state.

The delay element 3 contained in the watchdog sets a starting delay for the watchdog. The delay set by the delay element 3 prevents the watchdog from sending the microprocessor those reset pulses generated by the watchdog that are not to be sent. In the solution of the figure, the microprocessor performs the necessary initialization operations, such as loading the operating system, before being started. In a normal situation, the time it takes the microprocessor to perform the initialization operations is shorter than the duration of the predetermined starting delay, set by the delay element 3. On account of the starting delay, the microprocessor does not receive a reset pulse from the watchdog during the initialization. Since the time it takes to initialize the microprocessor is predetermined the number of reset pulses generated by the watchdog during the initialization can be counted in advance.

The number of reset pulses generated by the watchdog during the initialization is counted by the counter means 7. The watchdog is given a limit value to the number of reset pulses prevented during the initialization of the microprocessor. If the number of prevented reset pulses counted by the counter means 7 reaches the predetermined limit value, the watchdog transmits a reset pulse to the microprocessor. If the number of reset pulses counted by the counter means 7 during the starting delay formed by the delay element 3 does not reach the predetermined limit value, the reset pulse is not transmitted to the processor. The time the processor has used for initialization can be determined on the basis of the number of reset pulses counted by the counter means during the starting delay.

When the microprocessor has completed the initialization before the end of the starting delay, it starts to transmit acknowledgement pulses to the watchdog. The first acknowledgement pulse sent by the microprocessor activates the transmission means 5, which start to receive time limit information from the measurement means 4 as regards acknowledgement pulses. In addition, the first acknowledgement pulse received by the watchdog preferably removes the starting delay formed by the delay element 3. The first acknowledgement pulse sent by the microprocessor is not required to have an accurate transmission moment. The acknowledgement pulses sent after the first acknowledgement pulse, however, must be received at a certain moment to prevent the transmission of a reset pulse to the microprocessor.

The acknowledgement pulses received by the watchdog are compared with the time limit set by the setting means 6. If the watchdog does not receive an acknowledgement pulse sent by the microprocessor within a predetermined time, the watchdog transmits a reset pulse. The time limit set by the setting means 6 may be, for example, one second. It can be assumed at first that the time limit is set to one second. If the acknowledgement pulse in this case is not received within one second from the preceding acknowledgement pulse, the measuring means 4 of the watchdog send a reset pulse. The time limit can also be preferably set by the setting means 6 such that it contains a certain degree of tolerance. The tolerance may typically be, for example, 0.2 seconds. When the effect of tolerance is taken into account a reset pulse is not sent in the above-mentioned case, if an acknowledgement signal is received by the watchdog 0.8 to 1.2 seconds from the reception of the preceding acknowledgement signal. In this case, the setting means 6 have thus pre-set two time limits to the watchdog.

The measuring means 4 measure the interval between acknowledgement pulses. The measurement of the interval can be based, for example, on measuring the time between successive acknowledgement pulses. It may also be based on counting the number of various counting pulses generated during the interval between acknowledgement pulses. The means 6 preferably set time limits to the measuring means 4: acknowledgement pulses received within these time limits do not cause a reset pulse to be sent to the microprocessor. An acknowledgement pulse received by the watchdog outside the time limits set by the setting means 6 causes a reset pulse to be transmitted to the microprocessor. The reset pulse generated by the watchdog is fed back to the delay element 3, the measuring means 4, and the transmission means 5. The feedback ensures that the watchdog is in the starting state after the transmission of the reset pulse.

If the acknowledgement pulse sent to the watchdog by the microprocessor is not received by the watchdog within the predetermined time limit set to the reception of acknowledgement pulses, the watchdog generates a reset pulse. The measuring means 4 measure the time from the preceding acknowledgement pulse sent by the microprocessor. The first acknowledgement pulse sent by the microprocessor activates the transmission means 5, which start to monitor signals supplied from the measuring means 4. On the basis of the measurement of the interval between acknowledgement pulses, the measuring means 4 send the transmission means 5 information on when an acknowledgement pulse should not be received. The transmission means 5 thus transmit a reset pulse to the microprocessor according to the measurement of successive acknowledgement pulses, carried out by the measuring means 4. On the basis of this measurement, the watchdog sends reset pulses when the intervals between acknowledgement pulses sent by the microprocessor are too long or too short. If an acknowledgement pulse sent by the microprocessor is not received by the watchdog within the permitted time limit, the watchdog sends the microprocessor a reset pulse, which resets the microprocessor. When the microprocessor receives the reset pulse, it starts initialization and is re-started.

Although the invention has been described above with reference to the example illustrated in the accompanying drawings, it will be clear that the invention is not limited to this example but can be modified in many ways within the scope of the inventive concept disclosed in the appended claims.

What is claimed is:

1. A method for resetting a processor by means of a watchdog, comprising:

performing an initialization by the processor;

sending acknowledgement pulses at predetermined intervals to the watchdog by the processor;

measuring the interval between the acknowledgement pulses sent by the processor;

generating reset pulses by the watchdog when the interval between the acknowledgement pulses differs from the predetermined interval;

setting a a predetermined limit value to the number of reset pulses generated during the initialization of the processor; and counting the number of reset pulses generated during the intialization and transmitting a reset pulse to the processor when the number of reset pulses generated during the initialization reaches the predetermined limit value.

2. The method of claim 1 further comprising setting time limits to the watchdog so that acknowledgement pulses received by the watchdog outside the time limits causes a reset pulse to be sent to the processor.

3. The method of claim 1 further comprising setting a starting delay for the watchdog for the duration of the initialization of the processor, whereby the transmission of reset pulses is prevented during the starting delay.

4. The method of claim 3 further comprising sending a first acknowledgement pulse when the initialization is completed, wherein the first acknowledgement pulse removes the starting delay.

5. The method of claim 1 further comprising preventing reset pulses from being sent to the processor during initialization if the number of generated reset pulses is lower than the predetermined limit value.

6. A watchdog for generating a reset pulse to a processor which can initialize itself and which sends acknowledgement pulses at predetermined intervals to the watchdog, the watchdog comprising:

transmission means for generating and transmitting reset pulses to the processor;

counter means for counting a number of reset pulses generated during initialization and for setting a predetermined limit value to reset pulses, wherein the transmission means sends a reset pulse if the number of reset pulses generated during initialization reaches the predetermined limit value; and measuring means for measuring an interval between acknowlegement pulses sent by the processor, wherein the transmission means transmits a reset pulse when the interval between acknowledgement pulses differs from the predetermined interval.

7. The watchdog of claim 6, further comprising a setting means for setting a time limit so that acknowledgement pulses received by the watchdog outside the time limit causes a reset pulse to be sent to the processor.

8. The watchdog of claim 6 further comprising a delay element for forming a starting delay which prevents the transmission of reset pulses during initialization, wherein the starting delay is removed when a first acknowledgement pulse is received from the processor.

9. The watchdog of claim 6, wherein the transmission means prevents the transmission of reset pulses generated during initialization if the number of generated reset pulses is lower than the predetermined limit value.

\* \* \* \* \*